Figure 1:
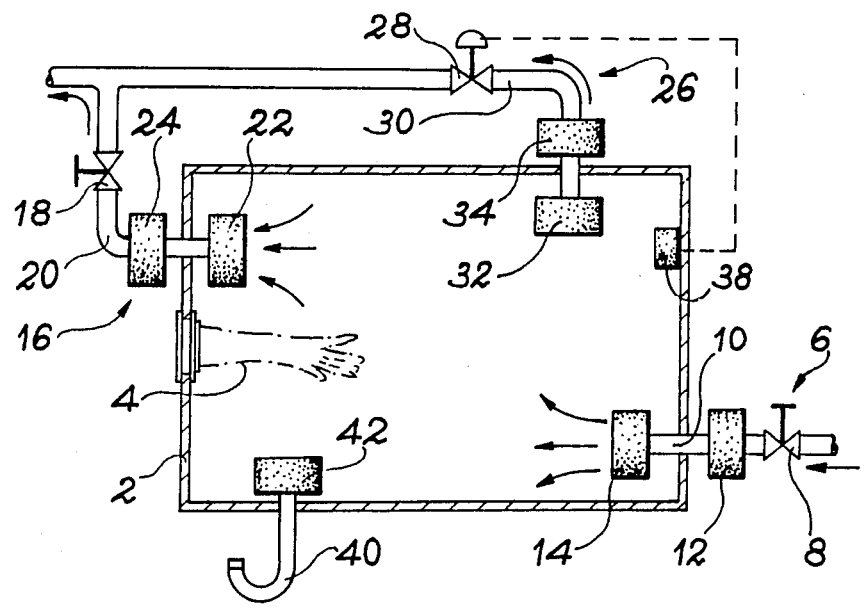

United States Patent [19]

Pruchon

[11] Patent Number: 4,704,951

[45] Date of Patent: Nov. 10, 1987

[54] VENTILATION SYSTEM FOR AN ISOLATION ENCLOSURE

[75] Inventor: Philippe Pruchon, Bagnols sur Céze, France

[73] Assignee: Cogema, Compagnie Generale des Matieres Nucleaires, France

[21] Appl. No.: 807,758

[22] Filed: Dec. 11, 1985

[30] Foreign Application Priority Data

Dec. 11, 1984 [FR] France .................... 84 18901

[51] Int. Cl.$^4$ .................................. B08B 15/00
[52] U.S. Cl. ........................... 98/1.5; 55/213; 55/385 A; 98/115.3; 137/102; 137/907
[58] Field of Search ............... 98/1.5, 115.3; 137/102, 137/114, 907; 55/279, 213, 385 A, 21

[56] References Cited

U.S. PATENT DOCUMENTS

| | | | |
|---|---|---|---|
| 2,638,107 | 5/1953 | Teague, Jr. ............... | 137/114 X |
| 2,893,381 | 7/1959 | Black ........................ | 137/102 |
| 3,967,636 | 7/1976 | Pauwels .................... | 137/907 X |
| 4,435,194 | 3/1984 | Picard et al. .............. | 98/115.3 X |

FOREIGN PATENT DOCUMENTS

| | | |
|---|---|---|
| 1333220 | 6/1963 | France . |
| 1423883 | 11/1965 | France . |
| 2541748 | 2/1983 | France . |
| 735283 | 5/1980 | U.S.S.R. ............... 55/213 |

Primary Examiner—Harold Joyce

[57] ABSTRACT

A glove box having an air admission device (6) and an air exhaust device. The air admission advice (6) includes a moving mechanism (60, 76) of which at least a portion is situated inside of the valve body (44), this moving mechanism acting on the one hand on a regulating valve (94) and, on the other hand, on a low-vacuum safety device (98) adapted for plugging an exhaust pipeline (54) opening into the valve body (44).

8 Claims, 4 Drawing Figures

VENTILATION SYSTEM FOR AN ISOLATION ENCLOSURE

The present invention relates to the field of the ventilation of isolation enclosures, and more especially its subject matter is a safety system for assuring an appropriate flow of air in case of accidental variation of the pressure within the enclosure, which will be less bulky than the systems of the prior art.

In certain industries, such as the nuclear industry or the pharmaceutical industry, the manufacturing processes require isolation from the ambient air, either to prevent the propagation of contaminant products into the atmosphere, or to prevent the introduction of pollutants contained in the atmosphere into the place where the manufacturing process is being performed. This is why work is performed within isolation enclosures such as, for example, glove boxes. These enclosures are ventilated by ventilation networks which permit the control of the rate of flow and of the pressure prevailing in each of them. In the ventilation network, when air is admitted and exhausted, one or more high-efficiency filtration barriers are installed in order to trap the polluting or radioactive dusts.

In addition to devices necessary for regulating the rate of flow and the pressure within the enclosure (manual valve or regulating valve), it is often essential to provide additional safety equipment making it possible to reduce operating accidents and to maintain the integrity of the enclosure.

One accident that might occur is the rupture, accidental or not, of the wall of the enclosure. For example, when the wall is equipped with gloves, it might happen that one of the gloves will deteriorate or slip out of its fastening collar. In this case, the enclosure is provided with a second ventilating device making it possible to aspirate or pump, depending on the case, a much larger additional flow than the nominal flow. This rate of flow, called "safety rate of flow," induced through the orifice, creates a high air velocity preventing any transfer of pollutant. This circuit can include, for example, a full-opening valve controlled by the pressure in the enclosure, this safety circuit being, of course, itself equipped with one or more high-efficiency filtration barriers. In normal operation, these filters must be protected against any clogging, so as to allow the entire safety rate of flow to pass.

Another accident that can happen is an excessive increase of the vacuum in the enclosure, for example in the case of the untimely closing of the valves in the ventilation circuit, which can endanger the integrity of the walls. To forestall this type of accident, the enclosure is equipped with another mechanical or hydraulic safety valve.

Some of these devices are indicated in the cross-sectional view in FIG. 1, representing a glove box equipped with a ventilation system and with a security system of the prior art. In FIG. 1 there is seen an isolation enclosure 2 which, in the present case, is a glove box equipped with pliable gloves such as the glove 4 represented schematically in dash-dotted lines. The enclosure 2 is equipped with an air admission device 6 which is composed of a valve 8 mounted on a pipe 10 equipped with two filters of very high efficiency, viz., a filter 12 on the outside of the enclosure and a filter 14 on the inside. The enclosure 2 also includes an air exhaust device 16 which is composed of a valve 18 mounted on a pipe 20 on which there are two filters: a filter 22 inside of the enclosure and a filter 24 on the outside. To assure a sufficient flow of air in case of an accidental reduction of the vacuum in the enclosure, the latter furthermore includes a safety exhaust device which is composed of a valve 28 mounted on a pipe 30 equipped also with two filters, one filter 32 inside of the enclosure and one filter 34 on the outside. As it can be seen in FIG. 1, the pipe 30 is in communication with the exhaust pipe 20 which is the only one used in normal operation. As it can be seen also in FIG. 1, the safety valve 28 is controlled by a vacuum intake 38 placed inside of the enclosure.

If the glove 4 is damaged or becomes detached from its fastening collar, this causes an additional entry of air into the enclosure and hence an increase in the pressure within the latter. The vacuum intake 38 then causes the opening of the safety valve 28 inducing a safety air flow in the glove box 2. The result is then an increase in the rate of flow of air circulating in the enclosure, which permits maintaining the vacuum in the latter at a reasonable level until the necessary repairs are made.

The safety system is completed by a valve 40 equipped with a filter 42 which goes into action in case of an accidental increase in the vacuum within the enclosure 2, so that the outside air penetrates into the enclosure and maintains the vacuum at a suitable level.

A ventilation system like that of FIG. 1 has the disadvantage of being very bulky, because, in addition to the air admission device 6 and the air exhaust device 16, it is necessary to install the safety exhaust device 26, the vacuum connection 38 and the valve 40. This complicates the installation and takes up space inside of the enclosure, which is always a nuisance.

The present invention has precisely the object of remedying these disadvantages by proposing a ventilation system in an isolation enclosure that will be less bulky than the systems of the prior art.

The ventilation system that is the subject of the invention is applied to isolation enclosures equipped, in the classical manner, with an air admission device and an air exhaust device.

According to the chief characteristic of the invention, the air admission device includes a movable mechanism acting on a regulating valve on the one hand, and on the other hand on a low-vacuum safety valve adapted to close an exhaust line leading into to the valve body.

According to another feature of the invention, the movable mechanism includes:

a movable diaphragm inside of a casing, dividing the latter into a first compartment in communication with the said enclosure and a second compartment in communication with the exterior, a stiff plunger made integral with the diaphragm, and means for moving the low-vacuum safety valve when the plunger moves.

According to one particular embodiment of this system, the means for moving the low-vacuum safety valve when the plunger moves include:

an orifice created in this valve and permitting the passage of the plunger, a thimble integral with the low-vacuum valve, inside of which is one end of the plunger, and a spring disposed within the thimble and acting on the said end of the plunger.

According to a preferred embodiment of the invention, the system furthermore includes means for controlling and, if necessary, interrupting the admission of air into the enclosure in case of a lessening of the vacuum within the latter, these means for controlling and, if necessary, interrupting the admission of air including:

a partition separating the valve body into an upstream compartment and a downstream compartment, an orifice created in this partition and permitting the passage of the said plunger, the regulating valve, situated in the downstream compartment, being adapted to close the said orifice, and means for displacing the said regulating valve.

In the preferred embodiment, the means for displacing the regulating valve include:

a spring placed in the downstream compartment and acting on the regulating valve to thrust it toward the orifice so as to close the latter, and a cylindrical spacer disposed concentrically with the plunger, this spacer being situated on the upstream side of the said partition, accompanying the plunger in displacement, and being adapted to thrust the regulating valve against the force exercised by the spring.

It is likewise possible to provide means for increasing the rate of entry of air into the enclosure in case of an increase in the vacuum within the latter, these means for increasing the rate of entry of air including, in the preferred embodiment:

at least one orifice placing the valve body in communication with the exterior, a high-vacuum safety valve adapted to close this orifice, and a calibrated spring acting on the said valve.

Figure 2:
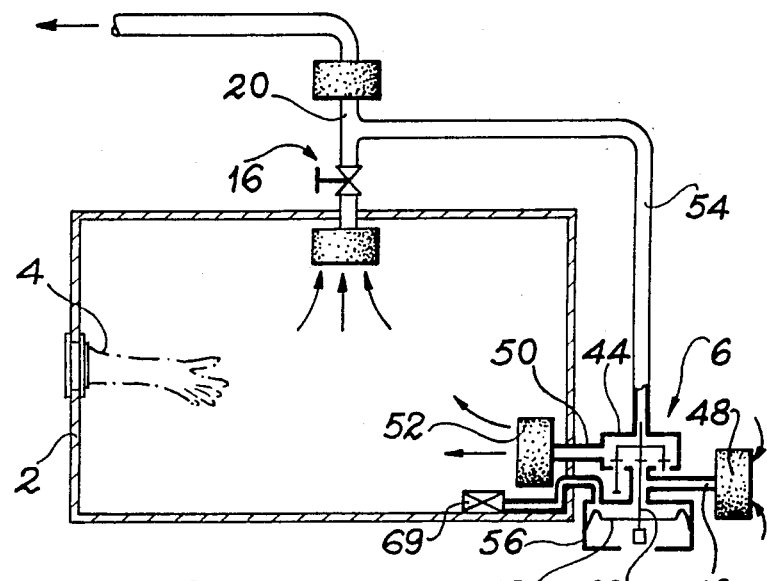
Figure 3:
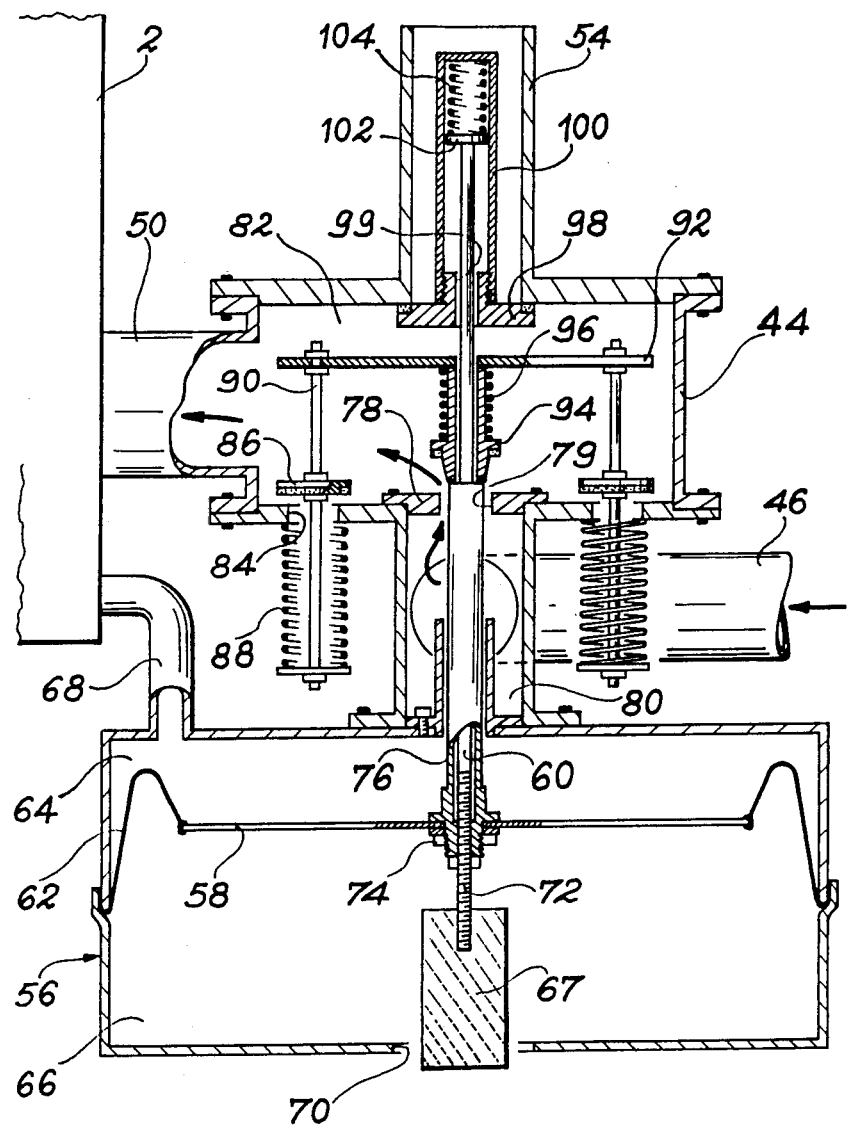
Figure 4:
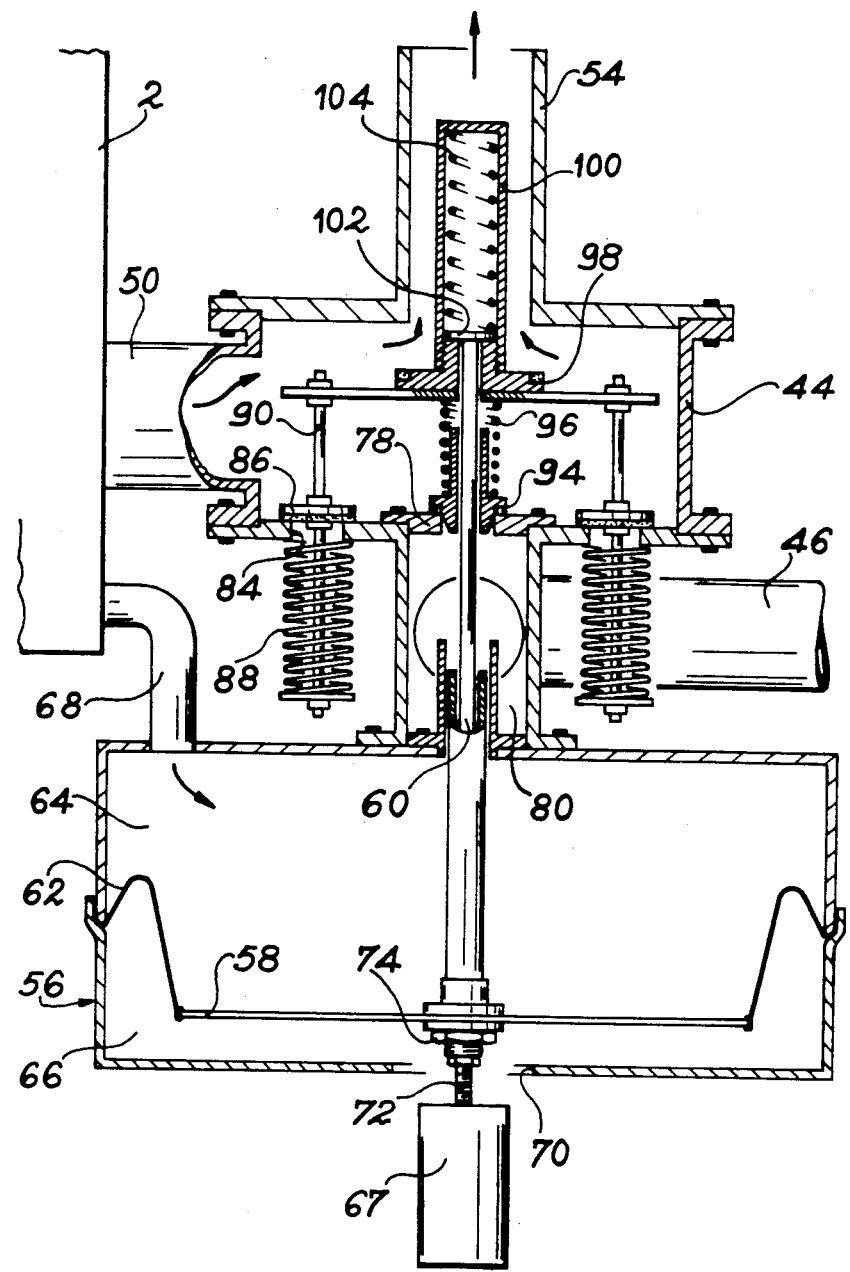

The invention will better appear in the reading of the description that follows, given by way of purely explanatory and by no means limitative example, in conjunction with the appended drawings wherein:

FIG. 1, already described, is a schematic view in cross section of a glove box equipped with a ventilation system according to the prior art, FIG. 2 is a schematic view in cross section of a glove box equipped with a ventilation system according to the invention, FIG. 3 is a schematic view in cross section on a larger scale representing the system of the invention in case of increase of the vacuum in the enclosure, and FIG. 4 is a view similar to FIG. 3 representing the system of the invention in case of decrease of the vacuum in the enclosure.

In FIG. 2 will be seen the enclosure 2 equipped with one or more gloves such as 4. The enclosure 2 is equipped with an air exhausting device 16 similar to the one in FIG. 1, while the air admission device 6 includes all the safety devices in accordance with the invention. Moreover, the safety devices themselves assure the regulation of the rate of flow of air in the enclosure, as will be described in greater detail in the continuation of the present description. The air admission device 6 is composed of a valve body 44 into which an air admission pipe 46 leads, which is equipped with a filter 48, while another pipe 50 equipped with a filter 52 puts the valve body 44 in communication with the interior of the enclosure 2. As it can be seen in FIG. 2, the system 6 furthermore includes a casing 56 situated in the immediate proximity of the valve body 44. A diaphragm 58 movable within the casing 56 separates the latter into two compartments, one of which is in communication with the exterior of the enclosure. A plunger 60 affixed to the diaphragm 58 shifts at the same time as the latter and operates the safety devices in case of accidental variation of the vacuum within the glove box 2. Furthermore, the plunger 60 also acts on the regulating valve, as will be explained further on.

The structure and the operation of the system of the invention will now be described in greater detail in reference to FIGS. 3 and 4. The normal operation will be described in conjunction with FIG. 3, although the latter represents the system of the invention in case of an abnormal increase of the vacuum in the enclosure. Indeed, in normal operation, the different elements of the system are in the position illustrated in FIG. 3, except that the high-vacuum valves 86 are engaged with their seats.

Referring to FIG. 3, the valve body 44 can be seen, into which the air admission pipe 46 leads while another pipe 50 puts the valve body 44 in communication with the interior of the enclosure 2. Also seen is the casing 56 inside of which a rigid diaphragm 58 moves. On the edges of the latter there is affixed a bellows 62 which is also affixed to the walls of the casing, creating within the latter two compartments separated in a leak-proof manner. Since, in the example shown here, the diaphragm 58 is horizontal, an upper compartment 64 is defined which communicates with the enclosure 2 through a tube 68 and a lower compartment 66 communicating with the outside atmosphere through an opening 70. A filter 69 is placed inside of the enclosure 2 at the exit opening of the tube 68. This arrangement has the purpose of protecting the upper compartment 64 against the pollution or radioactivity prevailing in the enclosure: it is thus possible to have access to the casing 56 without risk, for example in order to replace the diaphragm 58. Also seen in FIG. 3 is the plunger 60 which is disposed vertically and whose lower part has a screw thread 72. This permits the plunger 60 to be screwed into a nut 74 affixed to the diaphragm 58. This nut is prolonged on the compartment 64 side by a cylindrical spacer 76 which surrounds the plunger 60.

Inside of the valve body 44 there is disposed a partition 78, pierced by an orifice 79, which divides the valve body into an upstream compartment 80 into which the admission pipe 46 opens, and a downstream compartment 82. In the embodiment here represented, the casing 56 is affixed to the valve body 44 on the upstream compartment side, but it would be no departure from the scope of the invention to contemplate a casing 56 separate from the valve body 54. However, in any case, a portion of the plunger 60 and of the cylindrical spacer 76 is situated in the upstream compartment of the valve body 44.

In the preferred embodiment of the invention, there are provided in the downstream compartment 82 of the valve body 44 two openings 84 putting the latter in communication with the exterior. Each opening 84 can be closed by a high-vacuum safety valve 86 controlled by a calibrated spring 88. The valves 86 are connected by means of rods 90 to a horizontal bar 92.

A regulating valve 94 is mounted on the plunger 60 concentrically with the latter, and can slide along this plunger. A spring 96 mounted around the valve 94 has one of its extremities affixed to the bar 92, and it is adjusted to thrust the valve 94 in the direction of the opening 79 made in the wall 78 in order to block this opening.

Also seen in the figure is the safety tube 54 whose starting point is at the upper part of the valve body 44 in the downstream compartment 82 of the latter. A low-vacuum safety valve 98 normally blocks the entrance of the tube 54. The valve 98 has a central opening 99 permitting the passage of the plunger 60, while a thimble 100 is screwed onto the valve 98 on the side associated with the tube 54. The end of the plunger 60 opposite the diaphragm 58 is situated on the interior of this cylindrical box 100 and is equipped with an abutment 102, while a spring 104 is disposed between this abutment 102 and the closed end of thimble 100.

The operation of the system of the invention is as follows:

In normal operation, inasmuch as compartment 64 of the casing 56 is in communication with the interior of the glove box 2 through the tube 68, and the compartment 66 is in communication with the exterior, the pressure is lower in the compartment 64. This causes the ascent of the diaphragm 58 and consequently the ascent of the plunger 60 and of the cylindrical spacer 76. The length of the latter is made such that, in this position, the upper part of the spacer 76 pushes the regulating valve 94 against the force exercised by the spring 96. Since the plunger 60 is affixed to the spacer 76, the abutment 102 provided on the end of the plunger 60 compresses the spring 104; it is the latter which assures the regulation of the flow of air in the enclosure, as will be seen further below. The action exercised by the spacer 76 on the regulating valve 94 has the effect of opening the orifice 79 and permitting the passage of air from the admission pipe 46 to the glove box 2. On the other hand, since the plunger 60 is pushed upwardly, this has the effect of compressing the spring 104 provided inside of the thimble 100, and pushing the latter upwardly, that is, into the tube 54. Since the thimble 100 is affixed to the low-vacuum safety valve 98, the latter is applied to its seat, thus closing the entrance of the tube 54. The springs 88 are adjusted so that, in normal operation, the high-vacuum safety valves 86 will block the openings 84. The flow of air in the enclosure, and consequently the vacuum within the latter, is obtained by screwing the plunger 60 more or less into the nut 74 affixed to the spacer 76. If the plunger is in low position, the spring 104 is relaxed and offers little resistance to the ascent of the valve 94. If the plunger is higher, the spring 104 is compressed and offers greater resistance to the ascent of the valve 94. It is therefore the spring 104 that provides for the regulation of the rate of flow of air in the enclosure, whereas spring 96 serves only to apply the valve 94 to its seat. It is likewise possible to provide on the lower part of the plunger 60 a counterweight 67 into which the threaded part 72 of this plunger is threaded, the flow of air being obtained both by an appropriate screwing of the plunger 60 into the nut 74 and a judicious choice of the counterweight 67.

If the vacuum within the enclosure 2 diminishes, for example in the case of the rupture of a glove, the air rushes into the enclosure and the result is an increase of pressure in the compartment 64 of the casing 56, which has the effect of pushing diaphragm 58 downwardly (FIG. 4). The plunger 60 and the spacer 76 are driven downwardly, and this has two consequences: on the one hand the spring 96 pushes the regulating valve 94 toward the orifice 79 since the spacer 76 no longer stops the movement of the valve (FIG. 4). If the tension of the spring 96 is appropriately set, the valve 94 then blocks the orifice 79. On the other hand, the abutment 102 provided on the end of the plunger 60 opposite from the diaphragm 58 descends within the thimble 100, which has the effect of relaxing the spring 104. It can be seen in FIG. 4 that this abutment 102 will carry along with it the low-vacuum safety valve 98, which enables the air present in the enclosure to pass into the valve body 44 and, from there, into the safety pipe 54, thus establishing a safety flow of air into the enclosure.

If, on the other hand, the vacuum within the enclosure increases, for example in case of the obstruction of an air admission passageway, this vacuum increase is transmitted to compartment 64 of the casing and the diaphragm 58 will be driven upwardly. The plunger 60 then acts through the spring 104 on the thimble 100 and the low-vacuum valve 98, and the position of FIG. 3 is restored, in which the valve 98 is blocking the entrance to the tube 54. However, the cylindrical spacer 76 pushes the regulating valve more against the spring 96, which increases the flow of air entering the valve body. The regulating valve 94 abuts against the bar 92 and thrusts it upwardly. If the spring 96 on the one hand, and the springs 88 on the other, are appropriately set, this produces the opening of the high-vacuum valves, further increasing the air flow. Thus, the system of the invention offers particularly important advantages, the main one of which is that of being much less bulky than the systems of the prior art, since all of the safety systems are concentrated on the air admission device. Indeed, it is the same device that simultaneously provides three functions, viz.: regulation of the pressure in the enclosure, safety in case of reduction of the vacuum, and safety in case of increase of the vacuum. It is thus unnecessary to add an additional safety valve and an exhaust valve in the enclosure, as is the case in the classical systems. On the other hand, the operation of the safety devices must be regularly verified. In the present-day installations, this verification is not easy because, to check the operation of the valve producing the safety flow, it is necessary to enter into conditions wherein the operation of the installation is disturbed, and this can entail certain risks. In the system of the invention, however, these verifications can be performed without interrupting the performance of an operation within the enclosure. To verify the operation of the valves 86, it suffices to obstruct partially the entrance of air into the enclosure; this provokes a momentary increase in the vacuum within the latter: it is easy to see whether the valves 86 operate or not. And, to verify the operation of the low-vacuum safety valve 98, it suffices to raise the valves 86 by acting on the springs 88, which results in a reduction of the vacuum within the enclosure. Since the counterweight 67 is at least partially outside of the casing 56, a downward shift of this weight by a certain length means that the valve 98 has lifted from its seat. These verifications can be performed in a few seconds, without disturbing the operation of the enclosures and without breaking their isolation.

Lastly, it is well understood that the invention is not limited to the sole embodiment that has just been described herein, but that variants can be devised without thereby departing from the scope of the invention. For example, the high-vacuum safety system constituted by the bar 92 and the rods 90 can be replaced by a system constituted in the following manner: the bar 92 with which the regulating valve comes in contact is fixed with respect to the valve body 44, whereas the valve 94 is itself directly connected to the rods 90 by a rigid piece. As to the number of filters with which the system is equipped, and their location, it can be however desired, and depends on the degree of pollution within the enclosure.

I claim:

1. A ventilation system for an isolated, depressurized enclosure having an air admission and an air exhaust device, said air admission device comprising:
   a valve body having an orifice therein and communicating on the one hand with an air admission pipe with the interior of said enclosure, so that air flowing from said air admission pipe flows into said enclosure through said orifice,
   a regulating valve connected to the valve body for closing said orifice,
   control means on said valve body for controlling said regulating valve, said control means being responsive to changes in the pressure in the interior of said enclosure, said regulating valve being opened by said control means when the pressure inside said enclosure is below a predetermined level,
   an air exhaust pipe mounted on said valve body for exhausting air from inside said enclosure when vacuum inside said enclosure decreases, said air exhaust pipe being in fluid communication with said valve body
   a low-vacuum safety valve mounted on said valve body for closing said air exhaust pipe,
   said control means for controlling the regulating valve further comprising displacing means on said value body for displacing said low-vacuum safety valve, said control means and said displacing means progressively opening said low-vacuum safety valve as said regulating valve closes and progressively closing said low-vacuum safety valve as said regulating valve opens.

2. A ventilation system as in claim 1, wherein said controlling means for controlling said regulating valve comprise:
   a casing,
   a diaphragm movably mounted inside said casing and dividing said casing into a first compartment communicating with the interior of said enclosure and a second compartment communicating with the exterior of said enclosure, and
   a cylindrical spacer affixed to said diaphragm for opening said regulating valve.

3. A ventilation system as in claim 2, wherein said displacing means for displacing said low vacuum safety valve comprise:
   a plunger affixed to said diaphragm, and movably supported on said valve body,
   a safety valve orifice in said low-vacuum safety valve through which the plunger passes,
   a thimble affixed to said low-vacuum safety valve, one end of the plunger being located inside said thimble, and
   a spring disposed within said thimble and acting on said one end of said plunger.

4. A ventilation system as in claim 1 further comprising means for increasing air admission flow into said enclosure in case of increase of the vacuum inside said enclosure.

5. A ventilation system as in claim 4 wherein said means for increasing air admission flow into said enclosure comprise:
   an inlet orifice for establishing fluid communication between the interior of said valve body and the environment around said valve body,
   a high-vacuum safety valve mounted on said valve body for closing said inlet orifice, and
   a calibrated spring mounted on said valve body and acting on said high-vacuum safety valve.

6. A ventilation system as in claim 5 further including a second inlet orifice for establishing fluid communication between the interior of said valve body and the environment around said valve body, a second high-vacuum safety valve mounted on said value body for closing said second inlet orifice, a second calibrated spring mounted on said value body and acting on said second high-vacuum safety value, and means connecting said high-vacuum safety valves together.

7. A ventilation system as in claim 3 further including a counterweight attached to said plunger.

8. A ventilation system as in claim 2 further including a tube fluidly connecting said first compartment with the interior of said enclosure.

* * * * *